United States Patent [19]
Krause

[11] Patent Number: 5,270,622
[45] Date of Patent: Dec. 14, 1993

[54] BRUSHLESS MOTOR CONTROL SYSTEM

[75] Inventor: Kenneth W. Krause, Sandown, N.H.

[73] Assignee: Smith & Nephew Dyonics, Inc., Andover, Mass.

[21] Appl. No.: 867,871

[22] Filed: Apr. 13, 1992

[51] Int. Cl.$^5$ .............................................. H02P 6/02
[52] U.S. Cl. .................................... 318/254; 318/138
[58] Field of Search ................ 318/138, 254, 439, 480

[56] References Cited

U.S. PATENT DOCUMENTS

| | | | |
|---|---|---|---|
| 4,400,654 | 8/1983 | Elliott . | |
| 4,415,844 | 11/1983 | Mendenhall et al. | 318/254 |
| 4,680,513 | 7/1987 | Kennedy | 318/285 |
| 4,680,515 | 7/1987 | Crook | 318/138 X |
| 4,701,839 | 10/1987 | McNally et al. | 318/715 X |
| 4,720,663 | 1/1988 | Welch et al. | 318/254 X |
| 4,786,847 | 11/1988 | Daggett et al. | 318/568 |
| 4,868,469 | 9/1989 | Chan | 318/254 |
| 5,079,487 | 1/1992 | Malang | 318/254 |

FOREIGN PATENT DOCUMENTS 60-51492  3/1985  Japan .
WO9201330  1/1992  PCT Int'l Appl. .

Primary Examiner—Bentsu Ro
Attorney, Agent, or Firm—Rosenman & Colin

[57] ABSTRACT

An all-digital control system for a brushless, three-phase, DC motor includes a main signal processor in direct digital communication with a drive controller. The controller generates a pulse width modulated signal having a duty cycle established by the command signal. A three-phase bridge generates a two-state control signal in response to the pulse width modulated signal. The control signal has an on-state which lasts for the duty cycle. A digital tachometer signal indicative of motor speed or position is thereupon processed and reported back to the main processor.

9 Claims, 9 Drawing Sheets

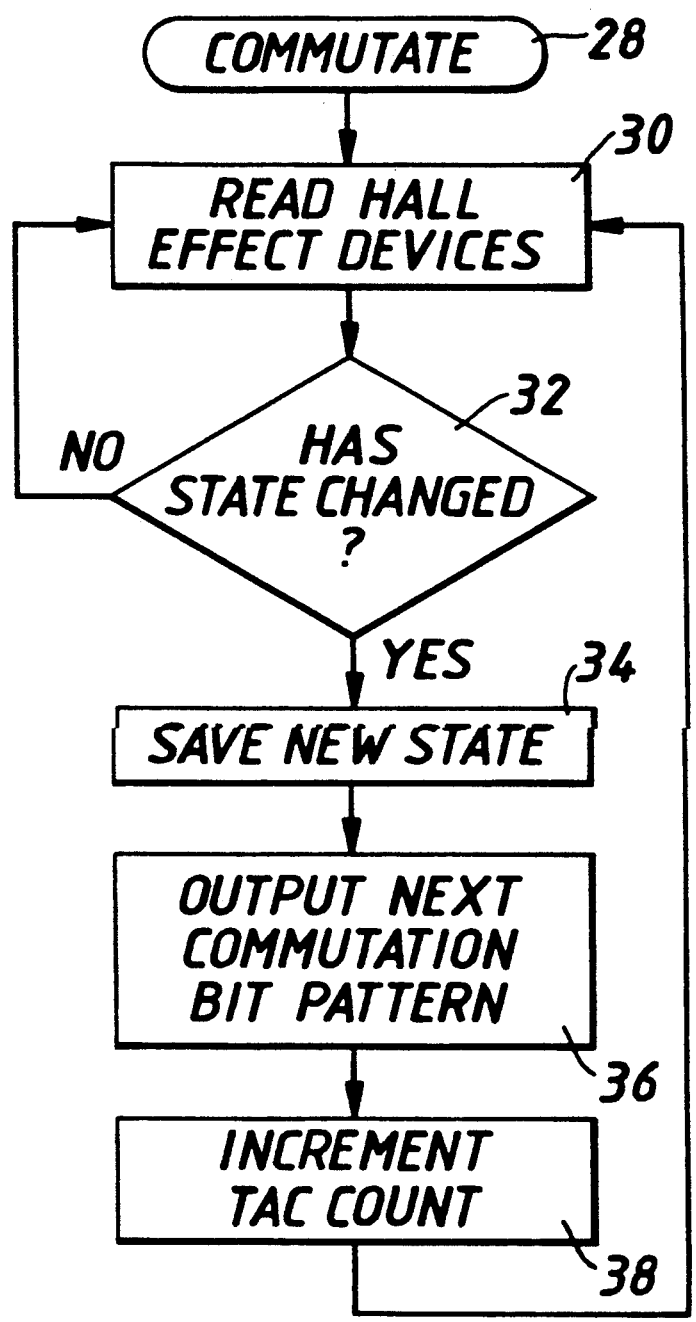

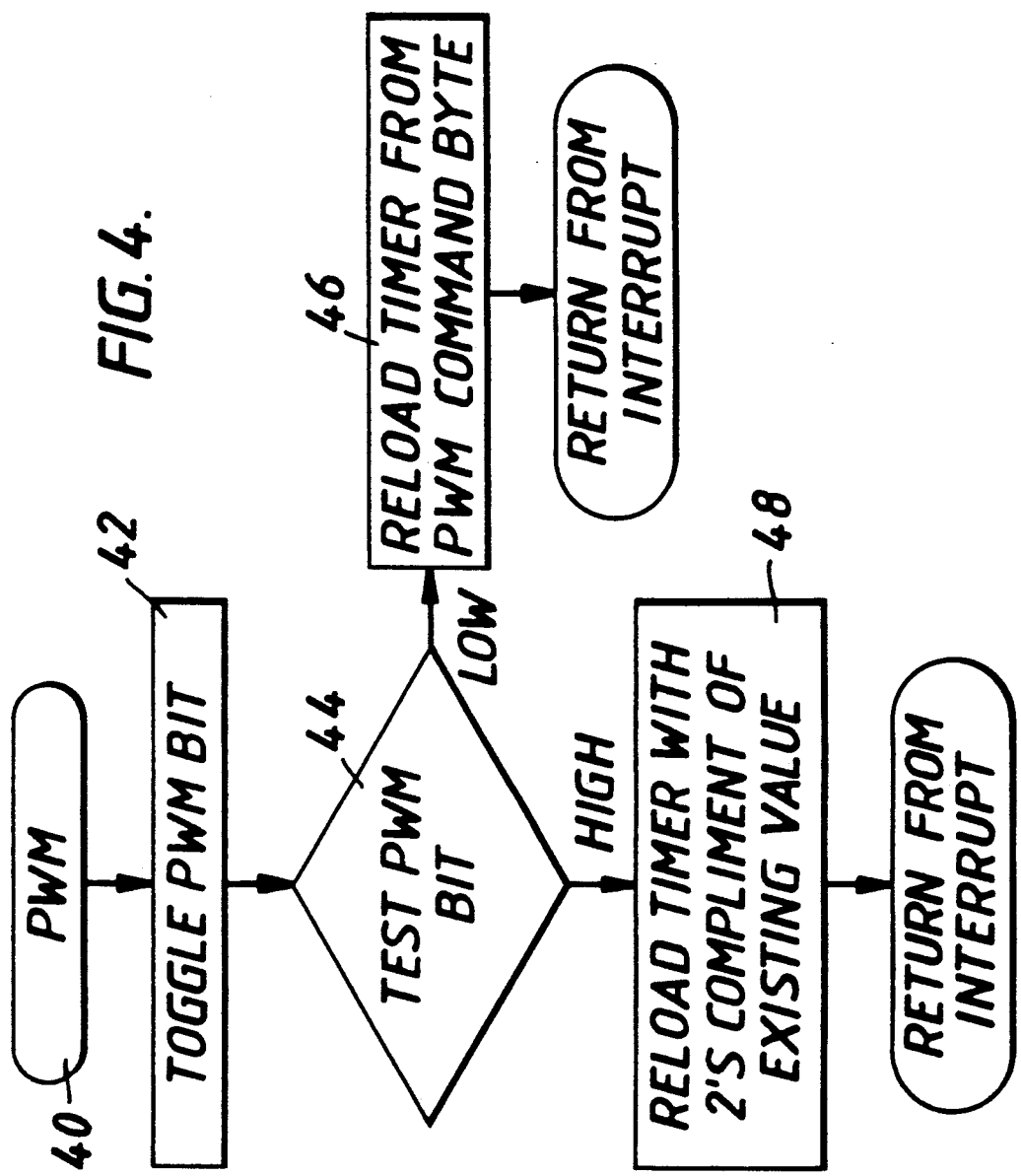

BRUSHLESS MOTOR CONTROL SYSTEM

BACKGROUND OF THE INVENTION

1. Field of the Invention

This invention generally relates to an all-digital motor control system and, more particularly, to a system for controlling the speed or armature position of a brushless, three-phase, DC motor.

2. Description of Related Art

Speed control systems for controlling the speed of a brushless DC motor are generally known. However, such systems rely, at least in part, on analog signals and analog-to-digital converters to convert the analog signals to digital signals for subsequent processing by digital signal processors. This adds hardware complexity and rigidity to the overall system, and the reliance on analog signals, at least in part, introduces an element of inaccuracy in motor speed control.

SUMMARY OF THE INVENTION

1. Objects of the Invention

It is a general object of this invention to advance the state of the art of speed control systems for brushless, three-phase, DC motors.

It is another object of this invention to reduce the hardware requirement and system rigidity in such speed control systems.

Another object of this invention is to provide all-digital accuracy in such motor speed control systems.

2. Features of the Invention

In keeping with these objects, and others which will become apparent hereinafter, one feature of this invention resides, briefly stated, in an all-digital control system for a brushless, three-phase, DC motor having an armature. The system comprises a main digital signal processor for supplying a digital command signal indicative of a desired motor operation. A drive controller in direct digital communication with the main processor generates, for each phase, and in response to the command signal, a digital commutation signal to rotate the armature, as well as a digital pulse width modulated signal having a duty cycle established by the input command signal.

The system further comprises switching means, e.g. a three-phase bridge, in digital communication with the controller. The bridge is operative for generating, for each phase, and in response to each commutation signal and each pulse width modulated signal, a digital two-state control signal having an onstate which lasts for the duty cycle.

The system still further comprises means in digital communication with the controller, for generating, for each phase, a digital tachometer signal indicative of armature position. The controller is further operative for processing the tachometer signal to generate a digital output signal indicative of the actual armature speed or position. The controller directly digitally communicates the output signal to the main processor.

In a preferred embodiment, the main processor and the drive controller are interconnected by, and digitally communicate through, a plurality of optical fibers. No analog signals and, of course, no analog-to-digital converters, are used anywhere in the speed control system, thereby simplifying the hardware requirement for such system, and also eliminating any inaccuracies due to the presence of analog signals.

Another feature of this invention resides in shutting down the system upon the elapse of a predetermined time during which no input signal is received by the controller.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 3 is a flow chart depicting part of the operation of the controller;

FIG. 4 is a flow chart depicting another aspect of the operation of the controller.

DETAILED DESCRIPTION OF THE PREFERRED EMBODIMENT

Figure 1:
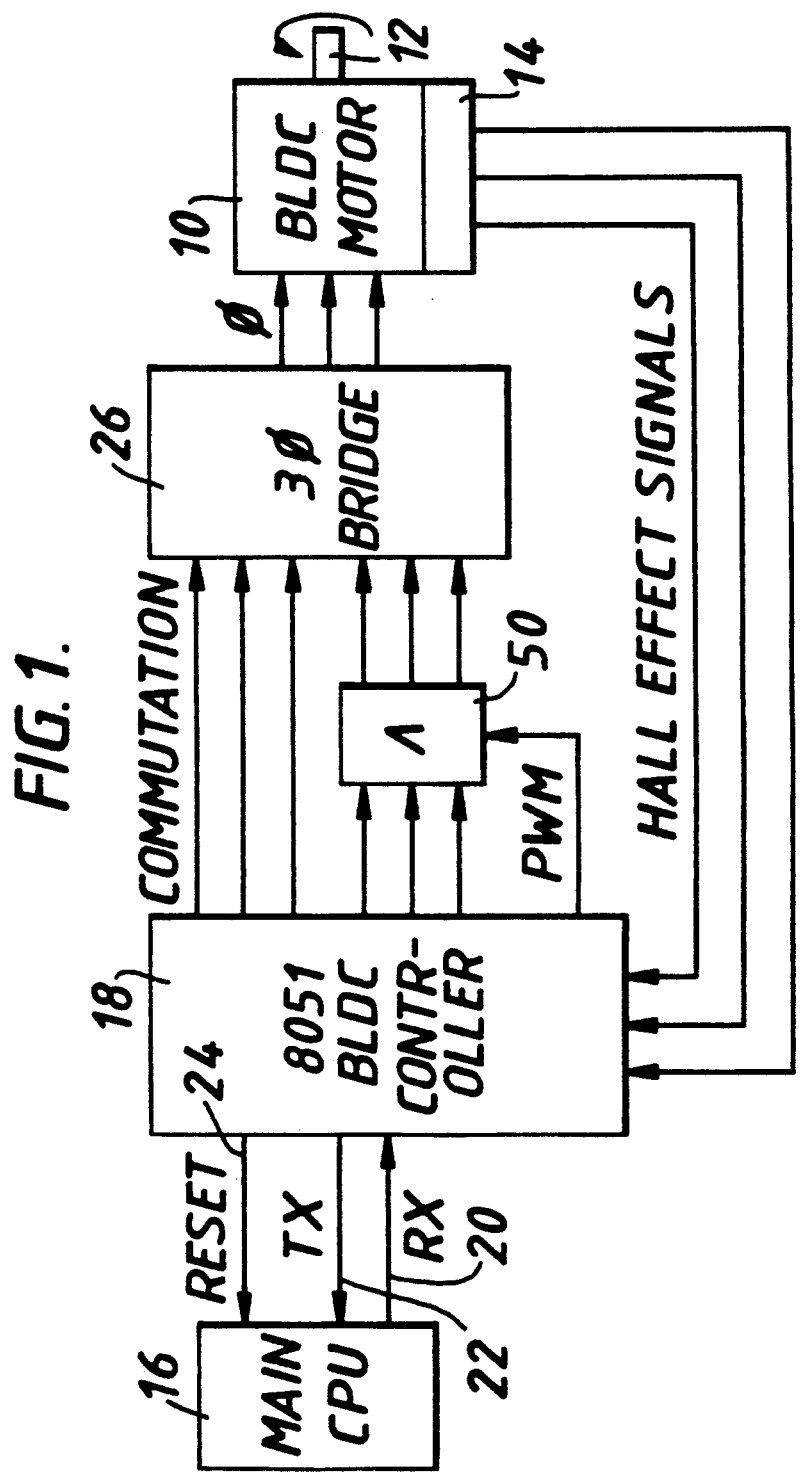
FIG. 1 is a general block diagram of the overall all-digital speed control system according to this invention.
Figure 2A:
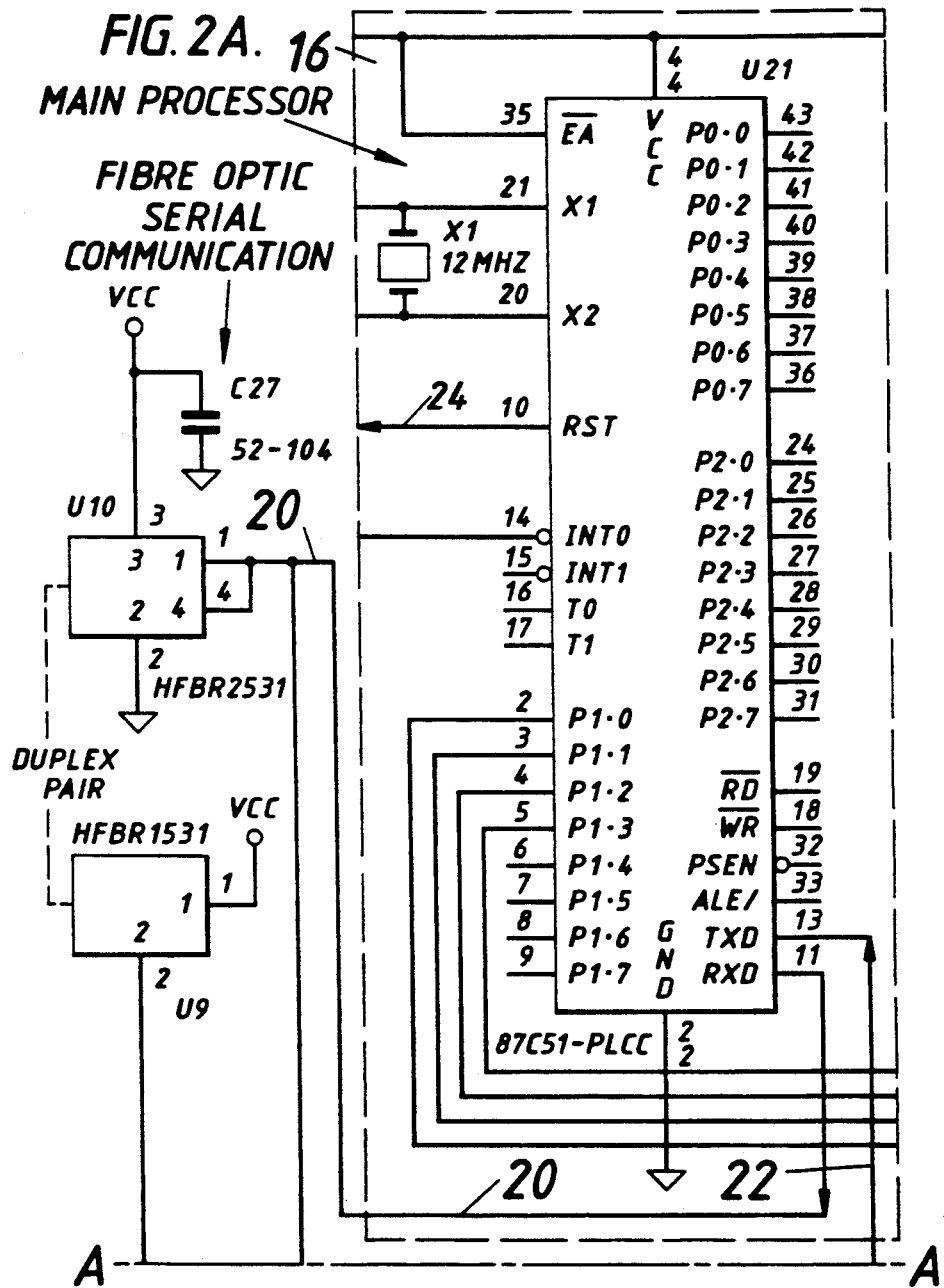
FIGS. 2A-2E are a detailed electrical schematic of the system of FIG. 1.
Figure 2B:
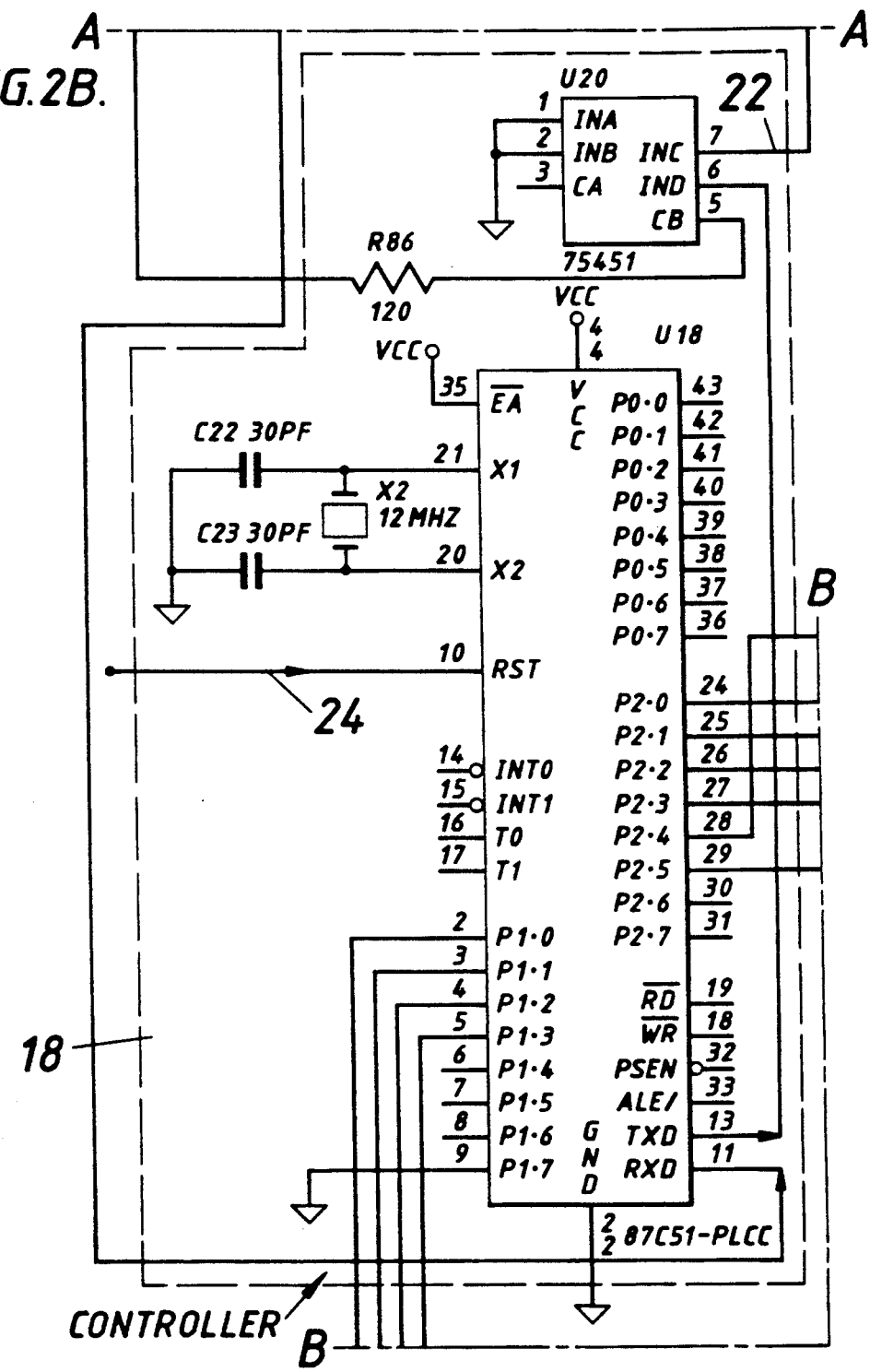
Figure 2C:
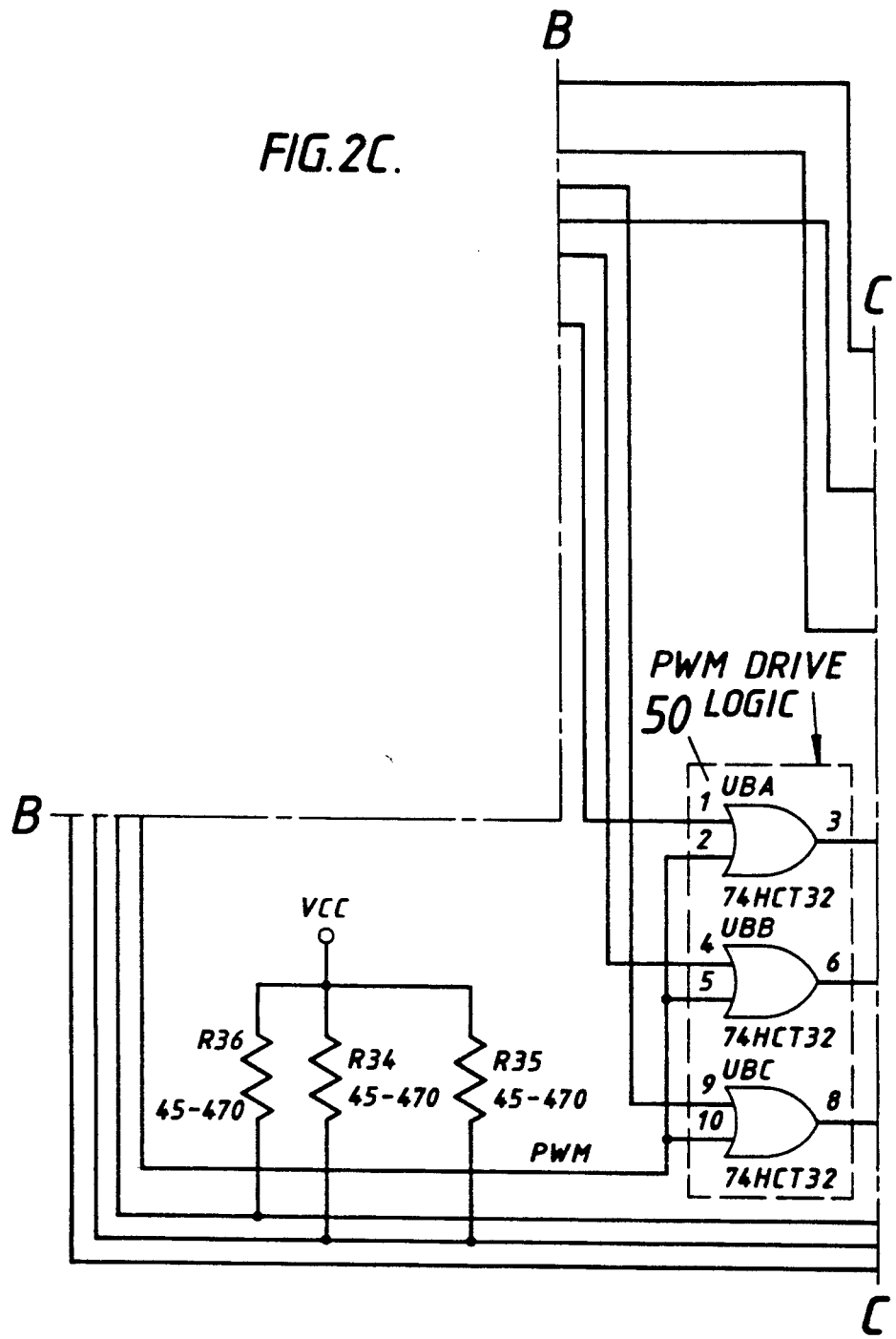
Figure 2D:
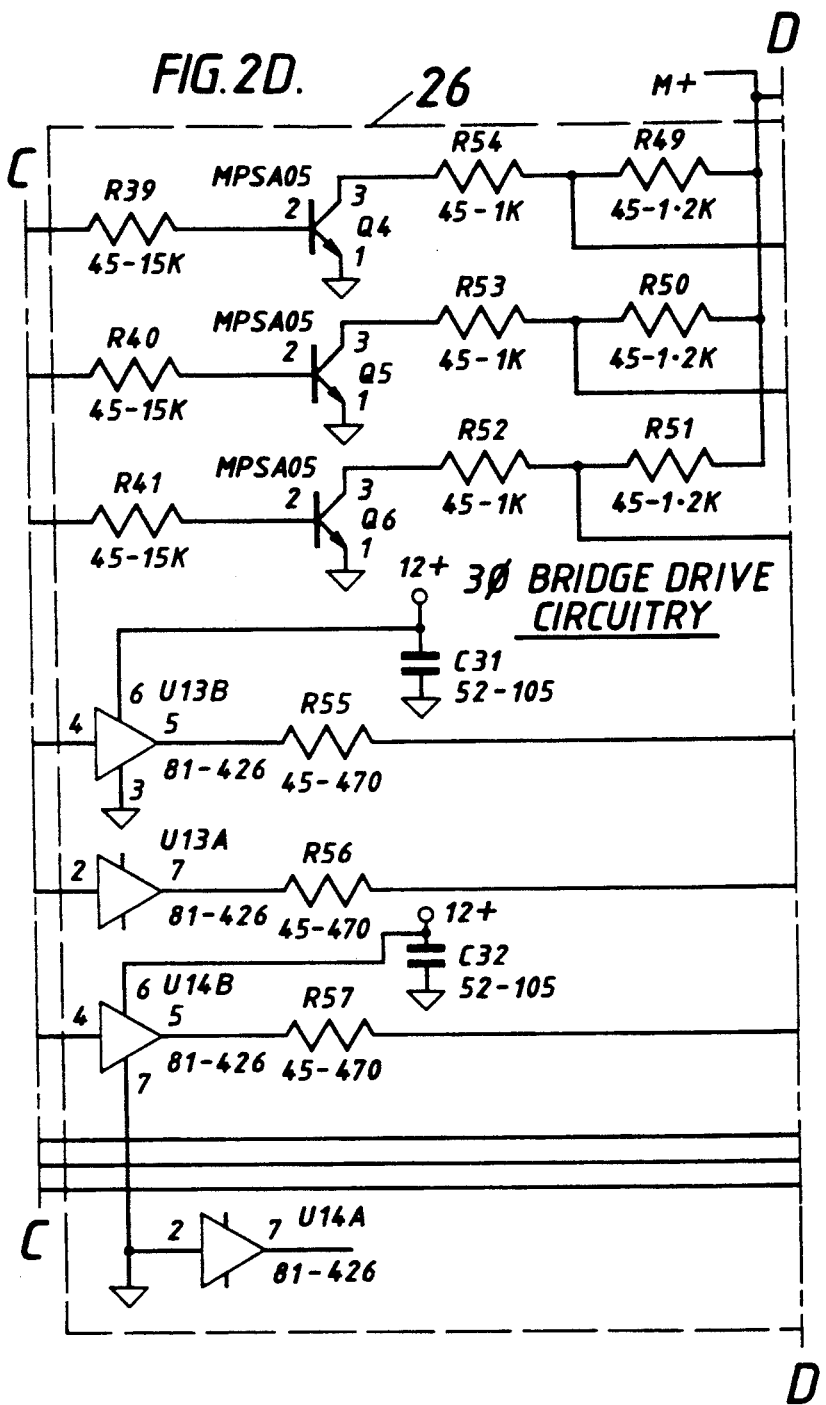
Figure 2E:
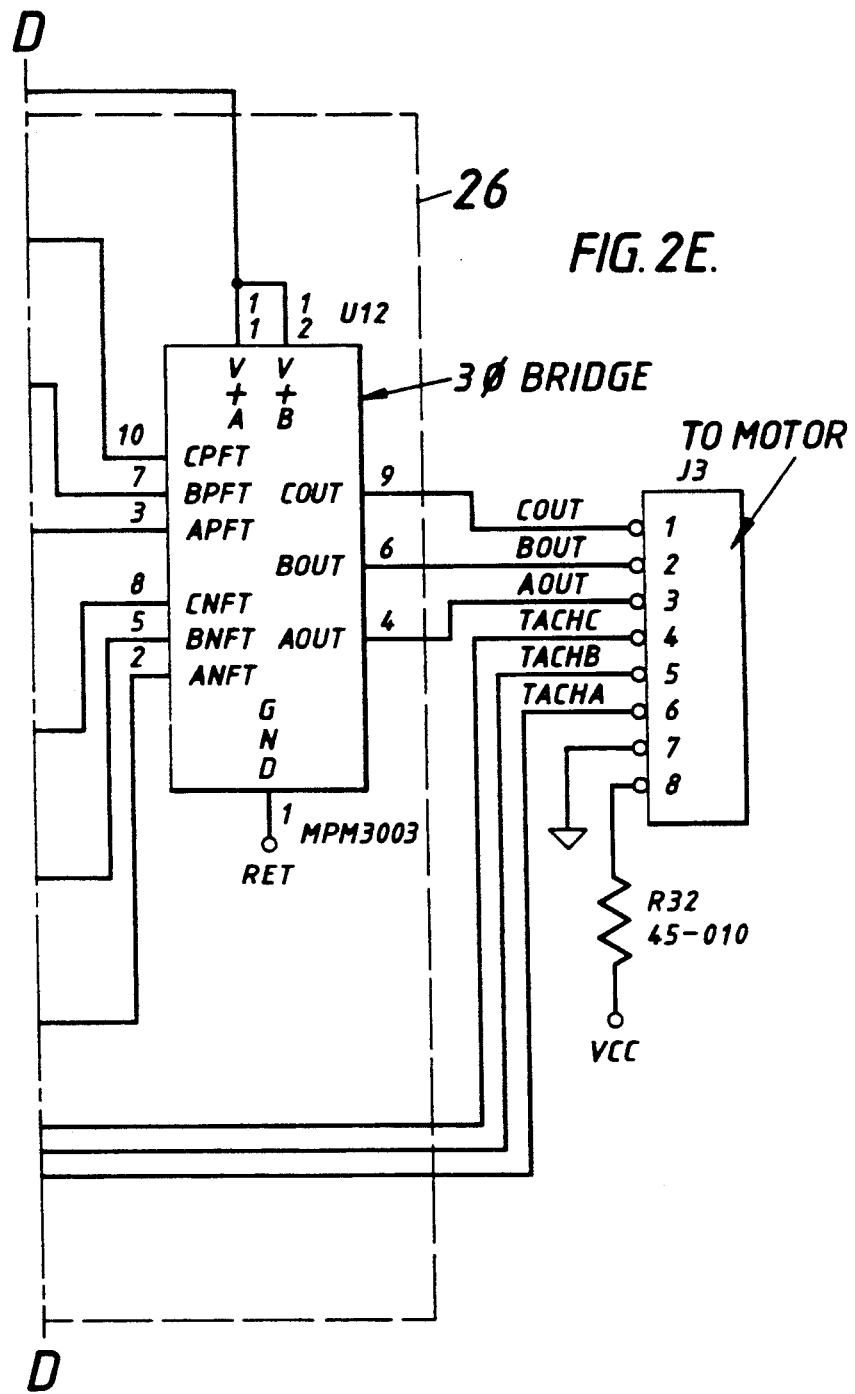

The present invention is illustrated in terms of a control system for controlling the speed of a brushless three-phase, DC motor. Referring now to the drawings, FIG. 1 is a general block diagram, and FIG. 2 is a more detailed electrical schematic, of the overall all-digital motor speed control system of this invention. Reference numeral 10 identifies a brushless, three-phase, DC motor having an armature 12. Preferably, the motor is obtained from BEI Kimco Magnetics Division of San Marcos, Calif. as its part No. DIH 23-20-BBNB. This motor has a plurality of conventional Hall-effect sensors 14 mounted about the armature to sense armature position.

The system includes a main digital signal processor (CPU) 16, preferably constituted as integrated circuit chip No. 87C51-PLCC. Main processor 16 is in direct digital communication with a drive controller 18, preferably also constituted as integrated circuit chip 87C51-PLCC. Processor 16 supplies a digital input speed signal RX indicative of a desired armature speed to the controller 18 over line 20. The controller 18, as will be described in detail below, supplies a digital output speed signal TX indicative of the actual armature speed to the processor 16 over line 22. Controller 18 also communicates with the processor 16 over a RESET line 24. Lines 20, 22, 24 are high speed serial buses capable of transmitting data at 3.75 kbaud. Preferably, communication lines 20, 22 and 24 are optical fibers. However, the main processor and the controller may communicate by any parallel or serial communication means such as a parallel communication bus, a high speed serial hardwired interface or the like.

Upon receipt of the input speed signal RX, controller 18 executes a software program as set forth on pages A-1 through A-3 of the attached Appendix. Controller 18 generates a set of six commutation signals, two for each phase of the motor, together operative for rotating the armature. More specifically, the controller includes an interior look-up table having a listing of six commutation bit patterns, each pattern representing a discrete command for the armature at an angular position spaced 60 electrical degrees from the previous armature position. The commutation signals are fed through, and processed in, a three-phase bridge circuit 26 and, optionally, through a bridge driver circuit (see FIG. 2), wherein three position control signals, one for each phase, are output to the motor 10. The Hall-effect sensors 14 sense rotation of the armature and generate two-state Hall-effect signals which advise the controller 18 when to generate the commutation signals.

This latter aspect of the operation of the controller 18 is displayed in the flow chart of FIG. 3. The generation of the commutation signals is indicated by block 28. The reading of the Hall-effect sensors is denoted by block 30. If the controller 18 recognizes that the state of the Hall-effect signals has changed (block 32), then the new state is saved (block 34) and the next commutation bit pattern is output to the motor (block 36). Thereafter, an internal counter operative for generating a tachometer (TAC) signal is incremented (block 38) prior to the next reading of the Hall-effect sensors. The tachometer signal is eventually processed to generate the aforementioned output speed signal TX. If the state of the Hall-effect sensors did not change in block 32, this indicates that the armature has not moved 60 electrical degrees and, hence, the controller attempts to read the Hall-effect sensors again in block 30.

Controller 18 also generates in response to command data from the processor 16, a digital pulse width modulated (PWM) signal having a duty cycle established by said command data. The PWM signal is carried on a carrier signal having a frequency which, in the preferred case, is 3.90625 kHz. Controller 18 has an internal software PWM timer which, in the preferred case, establishes a PWM cycle of 256 microseconds. The PWM cycle has a high and a low state. The PWM output is allowed to continue running during the high state, but is re-set to OFF in the low state. The command data controls how long the PWM timer runs; in the preferred case, from 14–242 μs. In this way, the duty cycle of the PWM signal is controlled from 5.47%–94.53%.

This aspect of the controller operation is depicted in FIG. 4. Block 40 represents the generation of the PWM signal. The controller toggles and generates a two-state PWM bit (block 42) and tests the state of the PWM bit in block 44. If the PWM bit has a low state, then, as depicted in block 46, the PWM timer is re-loaded from a command byte supplied by the processor 16. If the PWM bit has a high state, then the PWM timer is re-loaded with the 2's complement of its existing value (block 48).

As best shown in FIG. 1, the PWM signal is fed to a drive logic unit 50 which, as shown in FIG. 2, comprises three AND gates to which three of the commutation signals are conveyed. Unit 50 generates switching signals for the bridge 26. In turn, the bridge 26 generates, for each phase, the aforementioned modulated control signal having an on-state and an off-state.

Figure 5:
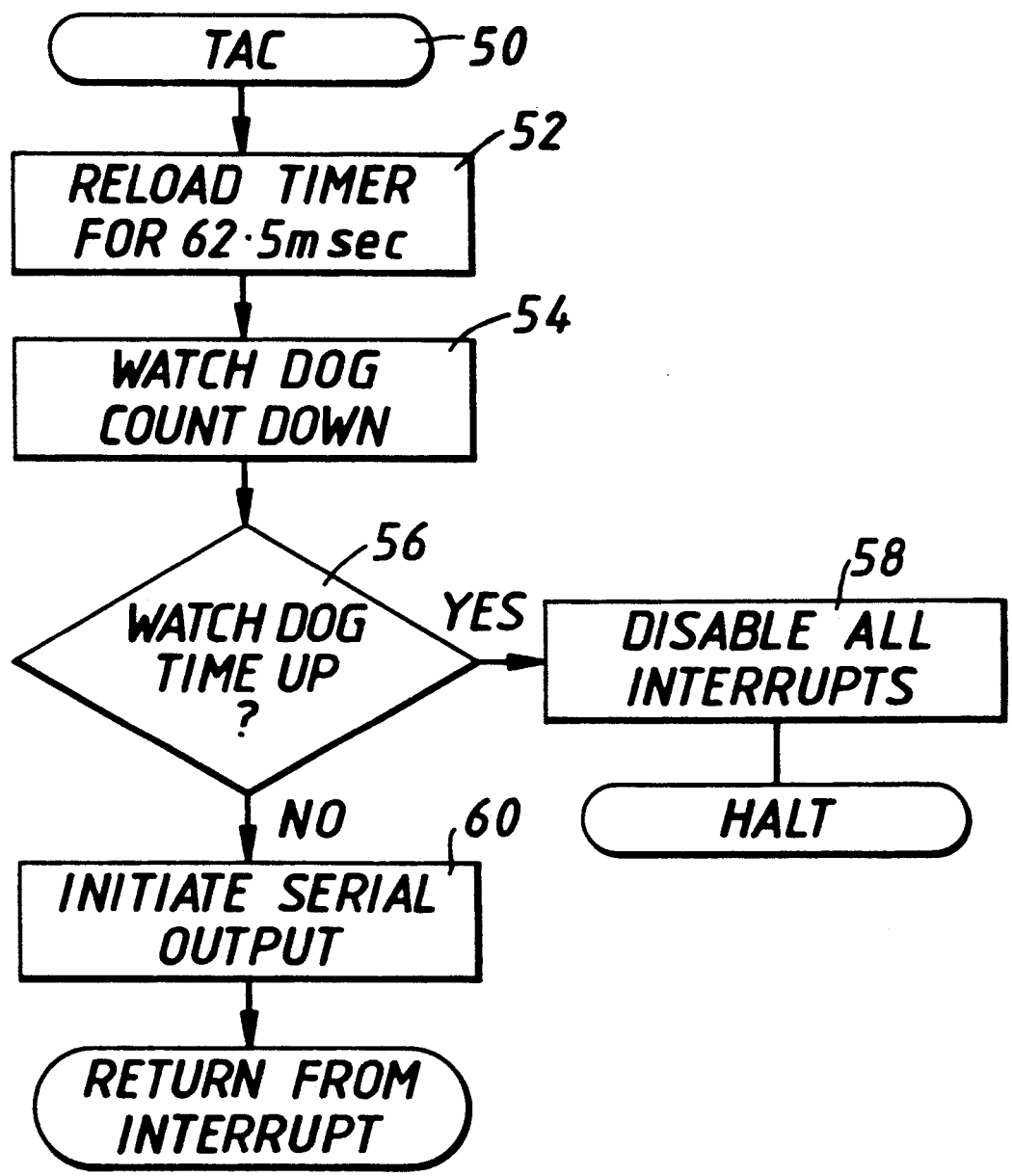
FIG. 5 is a flow chart depicting still another aspect of the operation of the controller.

As shown in the flow chart of FIG. 5, the Hall-effect sensors, as previously mentioned, send TAC signals back to the controller (block 50) and, more specifically, TAC signals are accumulated as they occur every 62.5 ms in a TAC timer (block 52). The resulting count from the TAC counter is processed into a tachometer signal which is processed by the controller and fed back to the processor 16 over line 22, and is indicative of the actual speed of the motor.

In accordance with another feature of this invention, a watchdog counter (block 54 in FIG. 5) has a pre-set count of, for example, 500 ms. Upon receipt of the TAC timer interrupt, the watchdog counter counts down. If, as determined in block 56, the 500 ms has elapsed, then the entire system is shut down (block 58). If, however, the watchdog time has not elapsed, then the command data from the processor 16 is sent to the controller over line 20 as denoted in block 60.

It will be understood that each of the elements described above, or two or more together, also may find a useful application in other types of constructions differing from the types described above.

While the invention has been illustrated and described as embodied in an all-digital speed control system for brushless three-phase DC motor, it is not intended to be limited to the details shown, since various modifications and structural changes may be made without departing in any way from the spirit of the present invention.

I claim:

1. An all-digital control system for a brushless, three-phase, DC motor having an armature, comprising:
   (a) a main digital signal processor for supplying a digital input command signal indicative of a desired motor operation;
   (b) a drive controller in direct digital communication with the main processor, for generating, for each phase, and in response to the command signal, a digital commutation signal to rotate the armature, and a digital pulse width modulated signal having a duty cycle established by the input command signal;
   (c) switching means in digital communication with the controller, for generating, for each phase, and in response to each commutation signal and each pulse width modulated signal, a digital two-state control signal having an on-state which lasts for said duty cycle;
   (d) means in direct digital communication with the controller, for generating, for each phase, a digital tachometer signal indicative of armature position;
   (e) said controller being further operative for processing the tachometer signal, to generate a digital output signal indicative of the actual armature speed or position, and for directly digitally communicating the output signal to the main processor, said controller including a look-up table having commutation bit patterns, each corresponding to a different armature position; and
   (f) said main processor and said controller being interconnected by, and digitally communicating through, a plurality of optical fibers.

2. The system according to claim 1, wherein the main processor and the drive controller are interconnected by, and digitally communicate through, parallel or serial optical fibers.

3. The system according to claim 1, wherein the pulse width modulated signal has two states, and wherein the controller includes timer means having a timer output signal whose duration is established by the state of the pulse width modulated signal.

4. The system according to claim 1, wherein the controller includes watchdog timer means having a predetermined watchdog time, and wherein the controller includes shutdown means for ceasing generation of the commutation signals upon elapse of said watchdog time without receipt of the input command signal.

5. An all-digital speed control system for a brushless, three-phase, DC motor having an armature, comprising:
- (a) a main digital signal processor for supplying a digital input speed signal indicative of a desired armature speed;
- (b) a drive controller in direct digital communication with the main processor, for generating, for each phase, and in response to the input speed signal, a digital commutation signal to rotate the armature, and a digital pulse width modulated signal having a duty cycle established by the input speed signal;
- (c) switching means in digital communication with the controller, for generating, for each phase, and in response to each commutation signal and each pulse width modulated signal, a digital two-state speed control signal having an on-state which lasts for said duty cycle;
- (d) means in direct digital communication with the controller, for generating, for each phase, a digital tachometer signal indicative of armature position;
- (e) said controller being further operative for processing the tachometer signal, to generate a digital output speed signal indicative of the actual armature speed, and for directly digitally communicating the output speed signal to the main processor, said controller including a look-up table having commutation bit patterns, each corresponding to a different armature position; and
- (f) said main processor and said controller being interconnected by, and digitally communicating through, a plurality of optical fibers.

6. The system according to claim 5, wherein the duty cycle of the pulse width modulated signal lies in a range between 5.47%-94.53%.

7. The system according to claim 5, wherein the pulse width modulated signal is carried on a signal carrier having a frequency of 3.90625 kHz.

8. The system according to claim 5, wherein the pulse width modulated signal has two states, and wherein the controller includes timer means having a timer output signal whose duration is established by the state of the pulse width modulated signal.

9. The system according to claim 5, wherein the controller includes watchdog timer means having a predetermined watchdog time, and wherein the controller includes shutdown means for ceasing generation of the commutation signals upon elapse of said watchdog time without receipt of the input speed signal.

* * * * *

UNITED STATES PATENT AND TRADEMARK OFFICE
CERTIFICATE OF CORRECTION

PATENT NO. : 5,270,622

DATED :December 14, 1993

INVENTOR(S) :Kenneth W. Krause

It is certified that error appears in the above-identified patent and that said Letters Patent is hereby corrected as shown below:

Column 4, line 19, insert the following, Appendix

Signed and Sealed this

Fourth Day of April, 1995

Attest:

BRUCE LEHMAN

Attesting Officer     Commissioner of Patents and Trademarks

APPENDIX

```
1   ;------------------------------------------------------------------
2   ; PWMV21 Serial Brushless Motor Driver for the 8051
3   ; KWK 10/12/91
4   ;
5   ; REV 1 01/23/92 KWK    Add watchdog time out with shut down
6   ;------------------------------------------------------------------
7   ;                       SPECIFICATIONS
8   ;BRUSHLESS MOTOR
9   ;    Phases / winding type:     3ø / Y
10  ;         Number of poles:      8
11  ;         Sensor sequence:      3 sensors @ 120° electrical
12  ;
13  ;PWM OUTPUT
14  ;         Carrier frequency:    3.90625 kHz
15  ;              Minimum PWM:     5.5 %
16  ;              Maximum PWM:     94.5 %
17  ;              PWM resolution:  1 µsec (.390625 %)
18  ;              PWM jitter:      2 µsec max
19  ;    Commutation phase error:   4 electrical degrees max
20  ;
21  ;TACHOMETER OUTPUT
22  ;                   Format:     Integral RPM / 40
23  ;                   Range:      0 - 10,200 rpm
24  ;                   Resolution: 40 rpm
25  ;                   Rate:       62.5 msec
26  ;
27  ;SERIAL I/O LINK
28  ;    Communication protocol:    Mode 2, multiprocessor communication,
29  ;                               asynchronous, bi-directional 3 byte
30  ;                               packet
31  ;              Baud rate:       375 kbaud
32  ;              Packet format:   sync_byte, data_byte, data_byte
33  ;              Input:           PWM command byte (14 - 242)
34  ;              Output:          Tachometer byte (0 - 255)
35  ;              Watchdog:        .5 second command refresh window else
36  ;                               shutdown. Hardware reset required.
37  ;------------------------------------------------------------------
38  ;8051 REGISTER USEAGE
39  ;                   r7:         Hall pattern input buffer
40  ;                   r6:         Tac count
41  ;                   r5:         PWM command
42  ;                   r4:         Receive character counter
43  ;                   r3:         Transmit character counter
44  ;                   r2:         Receive character buffer
45  ;                   r1:         Watchdog counter
46  ;------------------------------------------------------------------
47  ; PROGRAM AREA
48  ;
49          defseg  PWM,absolute
50          seg     PWM
51          jb      p1.7,start      ; Brushless motor driver
52          ajmp    stepper         ; Stepper motor driver
53  ;
```

APPENDIX

```
                        54  ; PWM output to p1.3 on timer 0 interrupt
                        55  ;
         =000B          56        org     0Bh           ; Timer 0 interrupt location
0008 B2 93              57        cpl     p1.3          ; Toggle pwm bit
000D 20 93# 03'         58        jb      p1.3,negate
0010 8D 8C              59        mov     th0,r5        ; Reload pwm when p1.3 = 0
0012 32                 60        reti
0013 63 8C' FF          61  negate xrl    th0,#0FFh
0016 05 8C              62        inc     th0           ; 2's compliment
0018 32                 63        reti
                        64  ;
                        65  ; Timer 1 interrupt location
                        66  ;
         =0018          67        org     1Bh
001B 20 97# 38'         68        jb      p1.7,tac_out  ; Brushless routine
001E 2128               69        ajmp    step_timer    ; Stepper routine
                        70  ;
                        71  ; Serial port interrupt location
                        72  ;
         =0023          73        org     23h
0023 20 97# 02'         74        jb      p1.7,pwm_cmd  ; Brushless SIO routine
0026 212B               75        ajmp    step_com      ; Stepper serial routine
                        76  ;
                        77  ; Receive PWM command
                        78  ;
0028 10 99# 23'         79  pwm_cmd jbc   ti,talk       ; Go to transmit interrupt routine
002B C2 98              80        clr     ri            ; Clear interrupt indicator
002D 30 9D# 0A'         81        jnb     sm2,receive   ; Data byte receive
0030 AA 99              82        mov     r2,sbuf       ; Get character from receive buffer
0032 BA FF 04'          83        cjne    r2,#0FFh,nosync ; Return if not sync byte
0035 7C 02              84        mov     r4,#2         ; Set incoming character counter
0037 C2 9D              85        clr     sm2           ; Prepare to receive data bytes
0039 32                 86  nosync reti
003A DC 0F'             87  receive djnz  r4,char1      ; Go to first character processor
003C C0 E0              88        push    acc           ; Second character processor
003E E5 99              89        mov     a,sbuf        ; Get second character
0040 B5 02 03'          90        cjne    a,2,err       ; Error if different from first character
0043 FD                 91        mov     r5,a          ; Make command data available to PWM routine
0044 79 08              92        mov     r1,#8         ; Reset watchdog counter
0046 D0 E0              93  err    pop    acc
0048 D2 9D              94        setb    sm2           ; Restore communication mode
004A 32                 95        reti
004B AA 99              96  char1  mov    r2,sbuf       ; Snatch first character
004D 32                 97        reti
                        98  ;
                        99  ; Tachometer data out on transmit interrupt
                        100 ;
004E DB 03'             101 talk   djnz   r3,notdone    ; Send 2 tac data bytes
0050 7E 00              102        mov     r6,#0         ; Reset tac
0052 32                 103        reti
0053 8E 99              104 notdone mov   sbuf,r6       ; Output tac data byte
0055 32                 105        reti
                        106 ;
```

APPENDIX

```
                            107  ; Initiate tachometer output to serial port on timer 1 interrupt
                            108  ;
0056 75 8B* E1              109  tac_out mov    tl1,#0E1h       ; Set for 62.5 msec (5μsec access)
0059 75 8D* 08              110          mov    th1,#08h
005C D9 06'                 111          djnz   r1,cont         ; Watchdog count down
005E C2 AF                  112          clr    ea              ; Turn off all interrupts
0060 D2 93                  113          setb   p1.3            ; Turn off n channel fets
0062 80 FE'                 114          sjmp   $               ; Lock up
0064 75 99* FF              115  cont    mov    sbuf,#0FFh      ; Send sync to initiate tac output
0067 78 03                  116          mov    r3,#3           ; Set transmit character counter
0069 32                     117  tac_end reti
                            118  ;
                            119  ; Initialize 8051
                            120  ;
006A 20 96# 05'             121  start   jb     p1.6,st1        ; cw = p1.6 hi
006D 90 00AE'               122          mov    dptr,#ccw-1     ; ccw = p1.6 lo
0070 80 03'                 123          sjmp   st2
0072 90 00A8'               124  st1     mov    dptr,#cw-1      ; Commutation translation table base address
0075 7F 00                  125  st2     mov    r7,#0           ; Force pass through main loop to start
0077 7E 00                  126          mov    r6,#0           ; Reset tac count
0079 7D 0E                  127          mov    r5,#0Eh         ; Minimum PWM
007B 79 08                  128          mov    r1,#8           ; Initialize watchdog
007D 75 89* 12              129          mov    tmod,#12h       ; Set timer 0 for mode 2 & timer 1 for mode 1
0080 8D 8A                  130          mov    tl0,r5          ; Set timer 0 for minimum PWM
0082 75 8C* F2              131          mov    th0,#0F2h
0085 D2 89                  132          setb   pt0             ; Set timer 0 priority
0087 75 8B* E1              133          mov    tl1,#0E1h       ; Set timer 1 for 62.5 msec (5μsec access)
008A 75 8D* 08              134          mov    th1,#08h
008D 43 87* 80              135          orl    pcon,#80h       ; Double baud rate
0090 75 98* 88              136          mov    scon,#088h      ; Serial mode 2, 375 kbaud, multiprocessor
0093 75 A8* 9A              137          mov    ie,#9Ah         ; Enable appropriate interrupts
0096 75 88* 50              138          mov    tcon,#50h       ; Turn timers on
                            139  ;
                            140  ; Main control loop
                            141  ;
0099 E5 90                  142  main    mov    a,p1            ; Main commutation / tachometer loop
009B 54 07                  143          anl    a,#7
009D B5 07 02'              144          cjne   a,7,comm        ; Check for change from previous
00A0 80 F7'                 145          sjmp   main
00A2 FF                     146  comm    mov    r7,a            ; Save previous state
00A3 93                     147          movc   a,@a+dptr
00A4 F5 A0                  148          mov    p2,a            ; Commutate
00A6 0E                     149          inc    r6              ; Increment tac count
00A7 80 F0'                 150          sjmp   main
                            151  ;
                            152  ; Motor phase excitation table
                            153  ;
00A9 23 0E 0B 38 32         154  cw      db     23h,0Eh,0Bh,38h,32h,2Ch ; Commutation bit array
00AE 2C
00AF 2C 32 38 0B 0E         155  ccw     db     2Ch,32h,38h,0Bh,0Eh,23h ; Commutation bit array
00B4 23
```